United States Patent [19]

Wennersten et al.

[11] Patent Number: 4,651,147

[45] Date of Patent: Mar. 17, 1987

[54] DEVICE FOR SETTING A NUMERIC DISPLAY

[75] Inventors: Lars H. Wennersten, Norsborg; Mats I. Kärrman, Bålsta, both of Sweden

[73] Assignee: AB Electrolux, Stockholm, Sweden

[21] Appl. No.: 550,393

[22] Filed: Nov. 10, 1983

[30] Foreign Application Priority Data

Nov. 30, 1982 [SE] Sweden .................. 8206845

[51] Int. Cl.$^4$ .............................. G09G 3/00
[52] U.S. Cl. ..................... 340/802; 368/85; 368/185; 368/225; 368/231; 340/809
[58] Field of Search ............ 340/802, 809, 511, 517, 340/724, 726; 368/76, 84, 185, 186, 224, 225, 229, 231, 155, 85; 445/154, 179

[56] References Cited

U.S. PATENT DOCUMENTS

| | | | |
|---|---|---|---|
| 3,733,810 | 5/1973 | Girard | 368/185 X |
| 3,789,387 | 1/1974 | Hurst | 340/815.31 X |
| 4,091,612 | 5/1978 | Meisner et al. | 368/155 |
| 4,193,686 | 3/1980 | Klank | 455/154 |
| 4,247,845 | 1/1981 | Schmidt et al. | 340/802 X |
| 4,282,513 | 8/1981 | Meisner et al. | 368/185 X |
| 4,400,093 | 8/1983 | Jaunin | 368/155 X |
| 4,549,173 | 10/1985 | Nakamura | 340/749 X |

Primary Examiner—Marshall M. Curtis
Assistant Examiner—Vincent P. Kovalick
Attorney, Agent, or Firm—Alfred E. Miller

[57] ABSTRACT

A device for setting a numeric display (11) comprises a continuously turnable potentiometer (12) by which the setting area can be repeatedly passed through by turning in the same direction. The potentiometer and the display are connected to a computer (10), preferably a microcomputer. The computer is arranged to repeatedly sense the instantaneous resistance value of the potentiometer or a parameter representing said value. Further, the computer is arranged to store the first one ($T_{1\,high}$) of a series of measurement values and for each subsequent measurement value ($T_{2\,high}$) in the series to determine if the difference between the present and the first measurement value exceeds a reference value ($T_{diff}$), in which case the display (11) is operated to increase or decrease its value by one step of a predetermined magnitude.

10 Claims, 3 Drawing Figures

DEVICE FOR SETTING A NUMERIC DISPLAY

This invention refers to a device for setting a numeric display.

An electro-mechanical device for setting an electronic numeric display, for instance included in an electronic clock, is described in the German AS No. 2,628,794. By this device it is possible to set the numeric display so as to show the desired value by turning a knob, it being possible simultaneously to set minutes and hours. The device is designed so that changes in the indications of the display depend on the speed at which the knob is turned. Further, by turning the knob in a first direction an increase of the displayed value can be performed whereas turning in the opposite direction causes a decrease of the displayed value.

The known setting device includes a plurality of mechanical components involving a complex and expensive construction.

An object of the invention is to remove the said drawback in the known device and to provide a setting device allowing the same setting facilities as the known device but by using simpler and cheaper means. The object is achieved in a device having the characteristic features defined in the following claims.

Other objects and advantages of the invention will appear in the following description of an embodiment, reference being made to the accompanying drawings.

Figure 1:
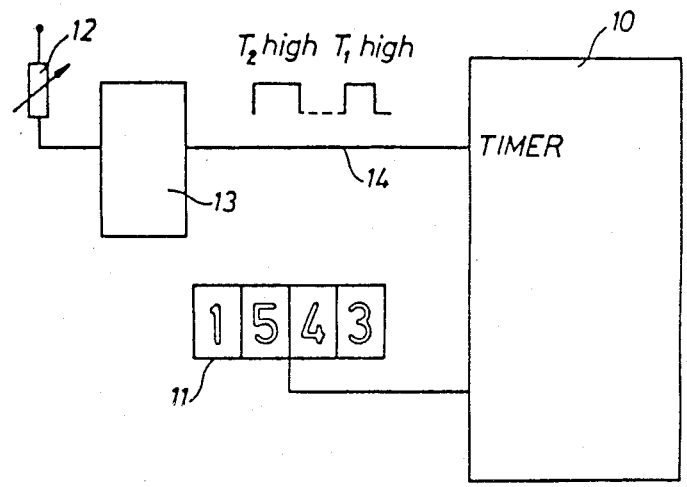
FIG. 1 is a block diagram of a setting device according to the invention comprising a manual setting means, a numeric display and a computer interposed therebetween.

The device shown in FIG. 1 comprises an electronic time display or clock 11 which is connected to a microcomputer 10 and indicates hours and minutes. The clock can be set on the desired time by operating a continuously turnable potentiometer 12, i.e. the resistance area can be passed through repeatedly on turning in the same direction. The potentiometer 12 is connected to a voltage-controlled oscillator 13, for instance of the type 555. The oscillator is connected in such a manner that it emits pulses of constant period but with the duration of each pulse depending on the instantaneous setting. The pulses are transmitted via a conductor 14 to a timer input terminal of the microcomputer 10.

In order to operate the microcomputer to change the indication in the display 11 the resistance value per se of the potentiometer is not used but instead the difference between two resistance values originating from different measuring occasions included in a series of measurings. The duration of each pulse emitted by the oscillator 13 represents the instantaneous resistance value. The pulses from the oscillator are square-formed and the amplitude varies between a high and a low level. The computer 10 determines the duration of a pulse by measuring the time passing from the moment when the level on the conductor 14 goes high until it goes low again. The computer repeatedly samples the duration of the pulses from the oscillator 13 and after having stored the value $T_{1\ high}$ of the first measuring of a series, the computer determines after each new duration, called $T_{2\ high}$, if the absolute value of the difference between $T_{1\ high}$ and $T_{2\ high}$ exceeds a reference value $T_{diff}$, in which case the computer makes a change of the indication of the display by a predetermined amount N corresponding to the turning angle run through between the values $T_{1\ high}$ and $T_{2\ high}$. The smallest turning angle to be reflected on the display is determined by suitable selection of the magnitude of $T_{diff}$. Thus, it is possible to divide the complete revolution of the potentiometer into an arbitrary number of steps.

As appeared above, an increase or a decrease of the setting of the display takes place when $T_{diff}$ has been exceeded. In order to establish whether the potentiometer has been turned to the right (increase) or to the left (decrease) $T_{2\ high}$ and $T_{1\ high}$ with their respective signs are compared. Should the desired change of the displayed value be large, it would be desirable to have the change made in greater steps than in case of a small change. In order for this to be performed, several different values of N have been stored in the computer 10, such values varying logarithmically between a minimum and a maximum value. Further the selected N-value has been made dependent on the turning rate of the potentiometer such that a high rate corresponds to a higher N-value. The relationship between turning rate and N-value is determined by the computer in such a way that predetermined differences between $T_{1\ high}$ and $T_{2\ high}$ ($=T_{diff}$) correspond to predetermined addresses in a memory in the computer 10 where the different N-values are stored. Accordingly, the setting of the display from a first value to another value can be made first at a high rate and then at a low rate for exact setting of the new value.

One problem connected with continuously turnable or rotatable potentiometers is that the resistance path has a portion separating the points of the path having the highest and the lowest resistance value, respectively, said portion having infinite resistance. This infinite resistance value of the potentiometer cannot be taken into account but must be dropped. Such dropping can be made upon $T_{high}$ exceeding a reference value $T_{high}$ max. which corresponds to the highest resistance value of the potentiometer. The computer programme may then include a step providing for a comparison to be made between each $T_{high}$ value and the value $T_{high\ max}$ so that the unallowable resistance value can be discovered.

Figure 2:
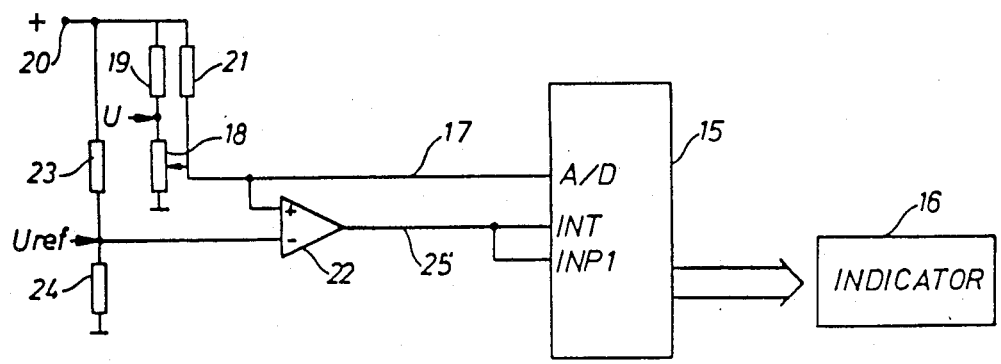
FIG. 2 is a block diagram of a modification of the device of FIG. 1.

One embodiment is shown in FIG. 2 where a microcomputer 15 is connected to a display 16 which indicates hours and minutes as in the embodiment of FIG. 1. The microcomputer has a built-in A/D-converter represented by an input designated A/D. The input A/D is via a conductor 17 connected to the slide of a continuously turnable potentiometer 18 one fixed terminal of which being connected to earth and the other fixed terminal of which via a resistor 19 being connected to a terminal 20 of positive potential. Further, the slide of the potentiometer is connected to the terminal 20 via a resistor 21. A comparator 22 is provided for indicating the turning position of the potentiometer in which the resistance value is infinite. The non-inverting input, referred to by "+", of the comparator is connected to the conductor 17 and the inverting input, marked by "−", is connected to a voltage divider comprising two resistors 23, 24 connected between the terminal 20 and the earth terminal. The voltage divider delivers a reference voltage $U_{ref}$ to the comparator 22 which is greater than the voltage U prevailing at the connecting point between the resistors 18 and 19 and corresponds to the highest resistance value of the potentiometer. The cmparator has an output terminal connected to an input designated by "INT" via a conductor 25. The designation "INT" stands for "interrupt" which means that a signal on this input starts an interrupt routine in the computer programme. The conductor 25 is tested via another input called "INP 1" to provide an indication of the ceasing of the interrupt signal which means that the unallowable turning position of the potentiometer has been passed.

Figure 3:
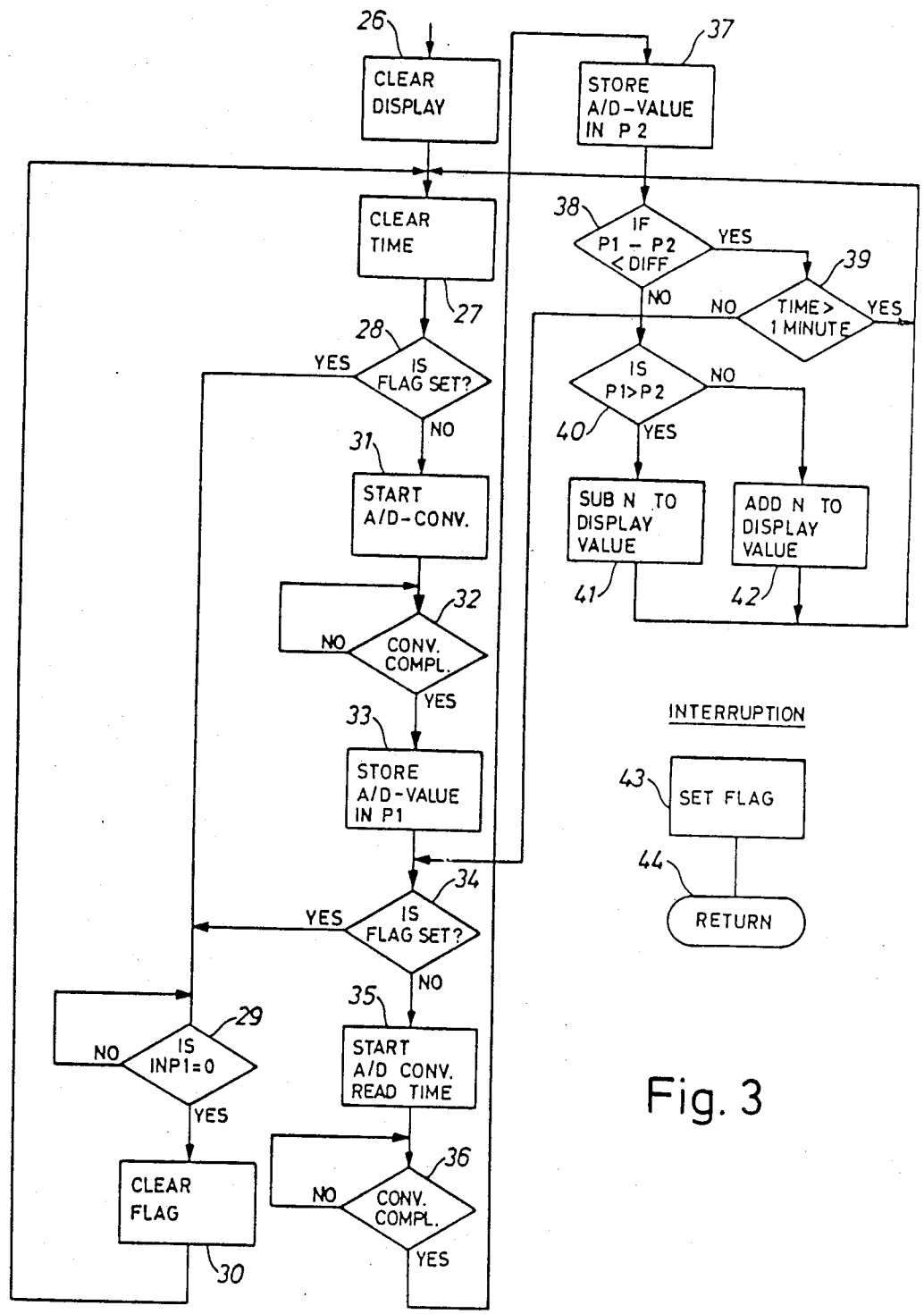
FIG. 3 is a flow chart of the device according to FIG. 2.

Before describing the function of the setting device according to FIG. 2 with reference to the flow chart shown in FIG. 3, it should be mentioned that the A/D-converter of the computer of FIG. 2 allows for the conversion of the potentiometer setting at each measuring occasion to a number which can be directly stored in the computer or be treated thereby in another way. The conversion takes place by using the voltage on the conductor 17 which reflects the setting of the potentiometer. Of course the A/D-converter can be made as a separate unit.

With reference to square 26 of the flow chart the computer first operates to reset or clear the display as well as a counter, square 27, which is part of the computer and counts the time between two consecutive A/D-conversions of the voltage on conductor 17 representing the turning position of the potentiometer. Before any A/D-conversion can take place the computer must check that the potentiometer has not taken a position outside the resistance area, the check being performed by controlling whether a flag has been set, square 28, as a result of an interrupt signal from the comparator 22 being received by the computer. In case the flag has been set, a wait routine is introduced meaning that the input "INP 1" is repeatedly sensed until the interrupt signal from the comparator 22 has ceased, square 29. Upon ceasing of the interrupt signal the flag is reset, square 30, and the programme restarts from the step, square 27, where the counter was reset. When a repeated check of the flag results in that the said flag is not set, the first A/D-conversion takes place in square 31 and in square 32 a wait routine is started for check of the conversion being completed. The next step, square 33, contains the storing of the converted value in register $P_1$, the value, for example in binary form representing the instantaneous position of the potentiometer. Prior to a new A/D-conversion it has to be checked again, whether the flag is set or not, see square 34. If positive, the routine represented by the squares 29, 30 will be performed giving a restart in square 27. If, however, the flag is not set, a new A/D-conversion takes place in square 35. In this square also the time elapsed between the two A/D-conversions is being read. A wait routine is established in the following square 36 to check the completion of the conversion. Then the converted number is stored in register $P_2$, compare square 37. This number represents the present turning position of the potentiometer. In order to determine whether the potentiometer has been turned after the previous measurement was performed, the difference between the numbers in $P_1$ and $P_2$ is calculated and this value is compared with a predetermined value corresponding to the smallest turning angle for the potentiometer that is to be reflected on the display 16. This programme step is included in square 38.

To avoid the effect of variations in temperature and supply voltage, square 39 provides for a check whether more than one minute has elapsed after the preceding measurement. If positive, restart will take place in square 27 involving the sensing of new values to be stored in the registers $P_1$ and $P_2$, respectively. If less than one minute has elapsed and, moreover, if the difference $|P_1-P_2|$ is below the reference value, restart takes place from square 34 in the programme, involving the sensing of a new value only for the register $P_2$. If the comparison in square 38 results in $|P_1-P_2|$ being above the reference value, it will be determined in the following square 40 if $P_1$ is $>P_2$. If positive, a predetermined number N is subtracted from the displayed value, square 41. If, however, $P_1$ is $<$ than $P_2$, the predetermined number N is added to the displayed value, see square 42. As indicated above, the number N can be made dependent on the difference $|P_1-P_2|$ so that the number N will increase as the difference increases, preferably in accordance with a logarithmic scale. Accordingly, a fast turning of the potentiometer will result in the display to change its indication at a higher rate. After the value of the display has been changed according to either one of the squares 41 or 42, the programme will return to square 27 involving the reading of new values to be stored in the registers $P_1$ and $P_2$.

The interrupt signal from the comparator 22 starts an interrupt routine comprising a square 43 "set flag" and a subsequent square 44 according to which the computer returns to the programme step in which the interrupt routine started, see FIG. 3. The interrupt signal indicates not only that the slide of the potentiometer is in an undefined resistance area but also that this area has been passed. The latter indication is required due to the fact that otherwise it might happen that upon turning to the right (increase) a $P_2$-value would be received which is below the previously stored $P_1$-value resulting in that the desired increase of the displayed value is replaced by a decrease. By the fact that the flag set by the interrupt signal always involves the reading of new values for the $P_1$ as well as the $P_2$ registers, it will be ensured that turning of the potentiometer to the right will always result in an increase and turning to the left will result in a decrease of the displayed value.

We claim:

1. In a device for setting a numeric display by stepwise change of the displayed value, the display being connected to a computer and the setting being controlled by a rotatable potentiometer coupled to the computer, the improvement wherein the potentiometer is continuously rotatable whereby upon turning in either direction every setting thereof is repeatedly passed through, the computer comprising means for repeatedly sensing a parameter representing the instantaneous resistance value of the potentiometer at a determined rate to produce a series of measured values, the computer further comprising means for storing each value of said series of measurement values and means for determining for each measurement value if the difference between the present and the preceding measurement value exceeds a reference value and in response thereto to operate the display to increase or decrease its value by a step of a predetermined magnitude.

2. A device according to claim 1, wherein a voltage-controlled oscillator is connected between the potentiometer and the computer to supply to the computer pulses of fixed period, the durations of which are dependent on the setting of the potentiometer, the sensing means comprising means for measuring the duration of each of the pulses, said means for determining comprising means for comparing the measured duration of each pulse with the duration of the previous pulse after the completion of each measurement, and means responsive to the absolute value of the difference between the compared durations exceeding a reference value for operating the display to increase or decrease its value by a step of said predetermined magnitude.

3. A device according to claim 1. wherein the rotatable potentiometer is connected to the computer via an A/D-converter, the sensing means comprising means to periodically sense the output of the A/D-converter, the means for determining comprising means for comparing this output with a preceding output thereof of a predetermined series of measurements and, means responsive to the absolute value of the difference exceeding a reference value for operating the display to increase or decrease its value by a step of the predetermined magnitude.

4. A device according to claim 1, wherein the computer comprises means for varying said predetermined magnitude as a function of the turning rate of the potentiometer.

5. A device according to claim 4 wherein the computer has stored therein several steps of different magnitude, each step corresponding to a predetermined turning rate of the potentiometer whereby a predetermined reference value is allotted to each step, said means for determining comprising means responsive to the exceeding of the reference value for changing the displayed value by the magnitude of the stored step corresponding to the turning rate.

6. A device according to claim 1, wherein the potentiometer has a resistance path and may be set at a position outside of said path, and means is provided to compare each measurement value relating to the setting of the potentiometer with a predetermined reference value corresponding to a setting in which the slide of the potentiometer is positioned at a position outside the resistance path, said means delivering an interrupt signal to the computer as soon as the slide has passed said position, said computer comprising means responsive to the interrupt signal for dropping all stored measurement values in the computer.

7. A device according to claim 2, wherein the potentiometer has a resistance path and may be set at a position outside of said path, and the computer comprises means for comparing each measured pulse duration with a reference time corresponding to the position assumed by the slide of the potentiometer outside the resistance path.

8. A device according to claim 6, wherein a comparator is connected to receive the predetermined reference value in the form of a reference voltage and to receive a voltage emanating from the potentiometer for the generation of said interrupt signal to supply its output to the computer when the slide of the potentiometer is positioned outside the resistance path.

9. A device according to claim 6, wherein a comparator is connected to receive the potentiometer voltage and a reference voltage corresponding to a setting of the potentiometer when the potentiometer slide is positioned outside the resistance path, the comparator being connected to generate said interrupt signal upon equality between the potentiometer voltage and the reference voltage.

10. A device according to claim 9, wherein the computer comprises a program, the computer being responsive to the interrupt signal to cause interruption of the program after completion of the step of the program currently being performed, an interrupt routine being provided which involves the setting of a flag, returned to the program step at which the interruption occurred and checking for an interrupt signal, the computer program comprising a wait routine for resetting the flag upon ceasing of the interrupt signal and initiating restart at a program step involving the storage of new measurement values for determining whether the potentiometer setting has been changed.

* * * * *